United States Patent [19]
Heller

[11] 3,867,495
[45] Feb. 18, 1975

[54] METHOD FOR FABRICATING MOLDED ELEMENTS BY BONDING SOLID PARTICLES WITH A RESIN

[75] Inventor: Rudolf Heller, Zurich, Switzerland

[73] Assignee: Contraves AG, Zurich, Switzerland

[22] Filed: June 2, 1972

[21] Appl. No.: 258,998

[30] Foreign Application Priority Data
July 7, 1971   Switzerland........................ 10029/71

[52] U.S. Cl................... 264/51, 260/2.5 F, 264/46, 264/DIG. 7, 264/DIG. 17, 264/DIG. 57, 264/DIG. 63
[51] Int. Cl............................ B29d 27/00, B29h 7/20
[58] Field of Search ... 264/46, 51, DIG. 7, DIG. 17, 264/DIG. 57, DIG. 63, DIG. 75; 260/2.5 F

[56] References Cited
UNITED STATES PATENTS

| | | | |
|---|---|---|---|
| 1,951,344 | 3/1934 | Caldwell | 264/DIG. 63 |
| 2,446,429 | 8/1948 | Nelson et al. | 260/2.5 F |
| 2,517,100 | 8/1950 | Erdle | 264/DIG. 57 |
| 2,586,275 | 2/1952 | Toulmin | 264/46 |
| 2,958,905 | 11/1960 | Newberg et al. | 264/DIG. 7 |
| 3,345,442 | 10/1967 | Oxel | 264/DIG. 7 |
| 3,577,363 | 5/1971 | Klug | 260/2.5 F |
| 3,657,188 | 4/1972 | Perkins | 260/2.5 F |
| 3,707,414 | 12/1972 | Wismer et al. | 260/2.5 F |

OTHER PUBLICATIONS

Chatfield, Varnish Constituents, London, Leonard, Hill Limited, 1953, TP938C53, pages 292–296.

Primary Examiner—Ronald W. Griffin
Attorney, Agent, or Firm—Werner W. Kleeman

[57] ABSTRACT

A method of fabricating dimensionally stable and load-carrying artificial concrete-construction elements wherein (a) a loose mass of mineral grains is admixed with (b) a relatively low amount of weight of a fine grain granulate of plastic material which can expand into essentially voluminous dimensionally-elastic foamed grains within a given swelling temperature range while internally developing pressure and (c) a non-hardened thermosetting resin which begins to gell within the aforementioned swelling temperature range and completely hardens at higher temperature values, until there is formed a homogeneous distribution of these components. This mixture is filled into the hollow mold cavity of a mold. The mold is then closed in a pressure-tight fashion. The mold is initially heated up to the swelling temperature range and thereafter to the higher hardening temperature range of the resin.

8 Claims, 2 Drawing Figures

METHOD FOR FABRICATING MOLDED ELEMENTS BY BONDING SOLID PARTICLES WITH A RESIN

BACKGROUND OF THE INVENTION

The present invention relates to a new and improved method for the fabrication of molded elements by bonding solid particles with a resin and, more specifically, concerns the fabrication of structurally stable, load-carrying artificial concrete-construction elements, typically plates, boards, slabs, blocks for instance, by bonding a quantity of hard mineral granules with an admixed, thermally hardenable synthetic resin under the action of pressure and heat in a pressure-tight mold until forming a monolithic hardened grain structure. The term "artificial concrete-construction elements" as used herein is intended to mean elements wherein the mineral granulate or grain mixture, instead of being admixed with cement and water as is usual, is combined with a thermally hardenable resin.

With known techniques of this type there is preferably employed as the hard mineral granules a sand-gravel mixture, for instance sea sand with rounded grains or quarry sand, for instance quartz sand or limestone-quarry sand and admixed gravel grains or expanded clay granules. The diameter should be in the range of 0.05 millimeters to 0.5 millimeters for more than 50 percent by weight of the granules, preferably for 90 percent by weight. The larger granules advantageously possess a diameter in the range of 1 millimeter to 5 millimeters. The proportion of dust should be retained as small as possible because stone dust does not contribute to the strength of the final product and absorbs a great deal of resin. In essence, the grain size spectrum corresponds to that of prefabricated concrete construction elements bound by a hydraulic setting cement. As the synthetic resin there is advantageously employed thermally hardenable duroplasts or acidic hardening additives. If desired, acidic hardening additives can be used for accelerating hardening of sand-gravel mixtures free of limestone.

To the extent that the quantity of mineral granules or grains as required is bound together into a compact grain structure by means of large surface, coherent, hardened synthetic resin layers, then, artificial or synthetic concrete-construction elements in comparison to hydraulic set cement concrete-construction elements of appropriate grain composition can possess similar compressive strength and considerably greater bending and tension strength. Furthermore, in contrast to cement concrete-construction elements thermally hardened synthetic resin concrete-construction elements possess considerably better resistance to ambient climatic conditions, generally better resistance to aging, as a practical matter do not store any moisture, and owing to their similar weight possess similar sound dampening properties as cement concrete-construction elements.

Notwithstanding these advantageous technological characteristics up to the present prefabricated artificial concrete-construction elements have found only relatively little use in the construction industry. This is especially so because of their greater fabrication cost in comparison to elements formed of cement concrete, gypsum, calcinated clay and similar natural building materials. Part of the increased fabrication cost for such artificial or synthetic concrete-construction elements is predicated upon the approximately ten-times greater cost per kilo of the synthetic resin in contrast to cement, gypsum and the like. Also the material processing costs for the fabrication of artificial concrete-construction elements, brought about by the requirement for thermal hardening under pressure, is basically greater than for cast or compacted cement concrete plates or gypsum plates or boards.

A necessary prerequisite for relatively frequent utilization of artificial concrete-construction elements in the construction industry would be fulfilled if there could be realized a considerably simplified and cost-saving fabrication technique for walls, partitions, floors and ceilings while using artificial concrete-construction elements with competitive costs for the finished product and wherein the elements possess the requisite quality. In this regard the present invention affords considerably more favorable prerequisites in contrast to the known state-of-the-art proposals. According to the proposals advanced in the art there is admixed to the quantity of loose mineral granules used as the inexpensive starting material, i.e. a sand-gravel mixture, an excess amount of liquid resin, that is, in an amount of 20 percent by weight and more, based upon the total weight of the final product. Thus, owing to the excess amount of resin there are absolutely no technological difficulties associated with compacting the mixture of mineral granules and resin in molds so as to obtain a bubble free or cavity free mixture in the mold, which mixture upon application of heat can harden into a monolithic structure of the required strength.

Apart from the fact that, as previously mentioned, for the industrial fabrication of plates or boards and other structural elements used in the housing construction industry the use of resin in such large proportion by weight cannot be accepted for reasons of price of the material, also such great content of resin is furthermore disadvantageous from the standpoint of the flame resistance of the final product.

To the extent that attempts have been made in the art to considerably reduce the proportion by weight of the resin in the sand-gravel mixture, preferably to values less than 10 percent by weight, then there is produced a relatively dry granule-resin mixture which only can be compacted in a mold under extremely high compressive forces such that the mold contents during subsequent heating can harden into a monolithic structure possessing the required strength. These high compaction pressures for mineral grains or granules which are poor in resin content, therefore relatively dry, are brought about owing to the fact that the mineral granules tend to locally wedge into blocking grain bridges which must be disintegrated by the externally acting compressive forces. Hence when fabricating standard plates or boards in thickness of 5 to 10 centimeters there must be utilized surface compression values in the order to 100 to 500 tons per square meter. Large surface-press machines capable of producing such high surface compressive forces are unrealistically expensive, also extremely subject to wear. It is for these reasons that with the state-of-the-art fabrication procedures it was only possible to produce individually in succession small size artificial concrete-construction elements of usable quality with a relatively small content of resin.

A further drawback of the known fabrication techniques for synthetic concrete-construction elements, apart from the compressive or pressure forces which must be externally exerted upon the mold contents, resides in the therewith unavoidably brought about dimension- and shape-inaccuracies of the fabricated construction elements. The final thickness to which the mold contents should be compressed locally and in its entirety under the influence of the external compressive force is left largely to a matter of chance. As a result there are, for instance, produced for a rated thickness of 60 millimeters deviations of 2 millimeters and more, that is, the artificial concrete-construction elements fabricated according to the known techniques are no more accurate as concerns their shape and dimensions than corresponding construction elements formed of cement concrete, gypsum and clay. Walls, partitions, floors and ceiling fabricated from such inaccurate construction elements must be plastered or planed prior to final use. Therefore, it should be recognized that it would be extremely desirable to be capable of fabricating artificial concrete-construction elements without expensive procedures such that they are accurate both as concerns their shape and dimensions so that post-treatment of the building surfaces produced therewith is no longer necessary. Now the invention is intended to realize two notable objectives for the purpose of overcoming the previously explained drawbacks of the known fabrication techniques for artificial concrete-construction elements, namely:

Even with a reduction in the resin content of a mineral grain-resin mixture to less than 10 percent by weight, related to the total weight of the final product, it is an objective of the inventive method, and without requiring high external compressive forces to act upon the mold contents, to render possible compaction and solidification of the mold contents into a monolithic structure, with correspondingly good guaranteed compressive and tensile strength, in an economical manner suitable for industrial mass production techniques.

Further, the inventive method as will be considered more fully hereinafter, has for an additional objective attaining considerable improvements over the state-of-the-art procedures heretofore proposed as concerns the dimension and shape accuracy of the fabricated artificial concrete-construction elements.

DETAILED DESCRIPTION OF THE METHOD ASPECTS

Now with the known technique for the fabrication of dimensionally or structurally stable artificial concrete-construction elements capable of supporting loads by bonding a quantity of hard mineral grains with a therewith admixed thermally hardenable synthetic resin under the effects of pressure and heat in a pressure-tight mold until forming a monolithic hardened granular structure, it is possible according to the invention to realize the aforementioned objectives in that the loose mass of mineral granules or grains has admixed therewith until obtaining a homogeneous distribution of components a relatively low amount by weight of a fine grain granulate of synthetic material which within a predetermined swelling temperature range and while internally developing pressure expands into essentially voluminous dimensionally-elastic foamed granules and a synthetic resin of a non-hardened thermosetting resin which begins to gell within the aforementioned swelling temperature range and at higher temperatures completely hardens. Thereafter, the hollow mold compartment is filled with this complete mixture and the mold contents, after pressure-tight closing of the mold, is initially heated to the expanding or swelling temperature range and thereafter to the higher hardening temperature of the synthetic resin. Preferably, homogeneous mixture is filled into a mold which is still permeable to water vapor after having been closed, which contains at least 85 percent by weight mineral granules, at most 5 percent by weight non-expanded polystyrene grit and at most 10 percent by weight liquid phenol-formaldehyde resin of the one-step resole type which gells in the expanding or swelling temperature range of the polystyrene (90°C to 110°C) and at higher temperature values (approximately 130°C to 150°C) is thermally hardenable, whereby the resin, based upon the liquid resin quantity, at most amounts to 20 percent of the volatile constituents (alcohol and water).

Apart from the phenol-formaldehyde resins there can be also used other resins. With the inventive method after heating the mold contents to the expanding or swelling temperature range the granules of the expandable synthetic resin material, for instance the polystyrene grit, uniformly distributed in the mineral granular mass, and while developing pressure expand into essentially voluminous and dimensionally-elastic foamed granules. These expandable particles, which are only locally spaced from one another through small distances of about 1 to 3 millimeters, during swelling or expanding, tend to locally compress the neighboring mineral granules and flatly press such against one another, so that the still soft resin tends to completely fill out the coherent small voids between mutually pressed together mineral granules on the one hand and the forming foamable granules filling out the somewhat larger cavities or voids in the grain structure on the other hand. Under the effect of the thus generated internal swelling pressure the mold contents as well as a portion of the resin are simultaneously pressed from the inside at all locations against the walls of the hollow mold cavity, so that there is thus ensured that the mold contents exactly assume the dimension and shape of the hollow mold cavity.

Since as required the resin begins to gell or solidify within the swelling or expanding temperature range and only with time and/or with gradual increase in temperature tends to harden to progressively increased strength, it is of no adverse consequence if with considerably higher final temperatures for realizing optimum hardening of the resin, the previous locally expanded foam granules are possibly thermally destroyed and therefore no longer fulfill their prior important local supporting function, because at that time the monolithic coherent resin bonding layers already have attained sufficient strength in order to prevent loosening of the granular structure in the closed mold. After complete hardening of the resin the foamed granules in any case no longer have to fulfill any supporting function. However, they are also not damaging insofar as the mineral granular-synthetic resin mixture does not have admixed thereto an excessively high percentage by weight of the expandable plastic material, for instance more than about 5 to 10 percent by weight. The hollow voids or spaces which remain at the grain structure after possible thermal destruction of the expanded foamed granules are not interconnected with one another by capillary compartments, so that the finished structural element does not suck-up any water. The inventive method does not require, following closing of the mold, compressing together the contents of the filled mold by external pressure effects during resin hardening. Conventional tamping or compaction machines can be effectively used for the uniform filling of the hollow mold compartment with the mixed material. After pressure-tight closing of the mold the filled molds can be left without attention in a furnace. In this regard what is important is the provision of means for bringing about a programmed heating of the mold contents as a function of time, for instance in order to be able to fabricate laminated concrete-construction plates, wherein there is filled into the press mold in layers mineral grain-mixtures with different high content of expandable granulates and/or different grain size spectrums which are thermally hardened under the development of internal pressure in one working operation. Thus, for instance for the fabrication of an 8 centimeter thick plate there can be introduced into the mold a first layer, a fine sand layer with a resin content of 8 percent by weight and polystyrene content of 2 percent by weight in a thickness of 1 to 1.5 centimeters, on top of which layer there is placed a sand-gravel layer, for instance containing expandable clay grains with a resin content of only 5 to 6 percent by weight and a polystyrene content of 4 percent by weight in a thickness of 5 to 6 centimeters, and thereafter again a layer of the first mentioned make-up. The finished plates exhibit a fine-structured external surface and a coarse structured core layer. By admixing mineral fibers, for instance asbestos fibers in percent by weight of at least 2 percent to 5 percent of the total mixture it is possible to considerably increase the tensile strength of the final product, and possibly while also realizing a saving in resin.

The invention will be further explained in conjunction with the drawing and examples to follow.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE DRAWING AND EXAMPLES OF THE INVENTION

Figure 1:
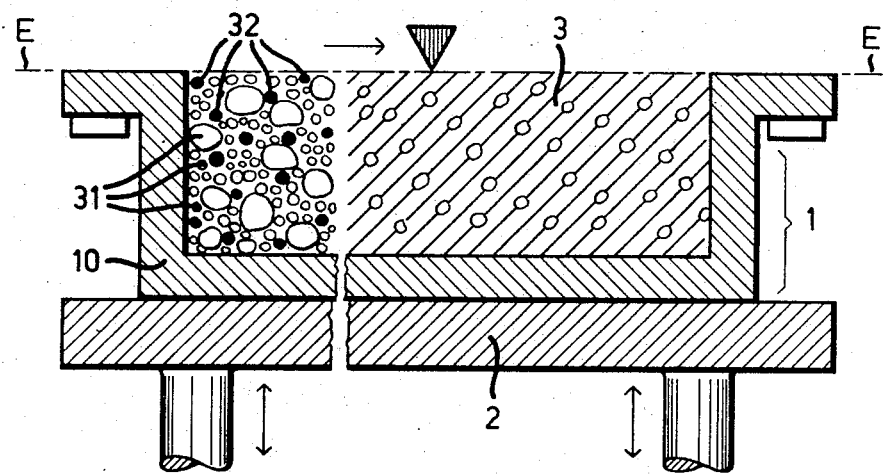
FIG. 1 is a cross-sectional view of the open press mold during filling of the hollow mold cavity with a mixture of gravel, sand, thermally expandable polystyrene grit granules and liquid thermally gellable and hardenable binder, for instance polyurethane resin or phenolic resin.
Figure 2:
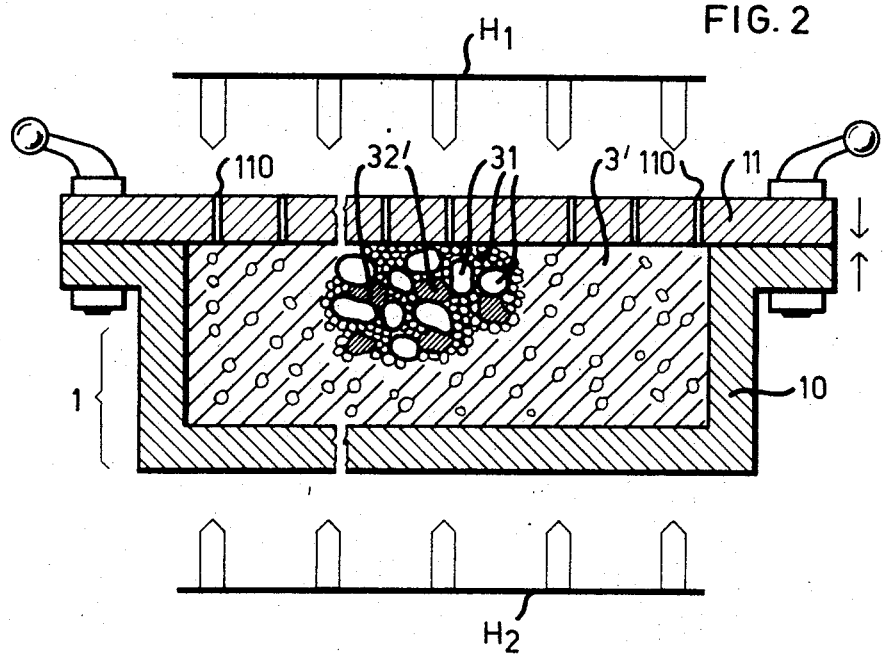
FIG. 2 illustrates the closed mold resistant to internal pressure with a compact structure brought about by the thermal expansion of the polystyrene grit granules to form-elastic flexible irregular formed foamed granules.

Describing now the drawing in both FIGS. 1 and 2 the walls of a plate press-hollow mold cavity 1, which can have dimensions for instance of 50 centimeters × 50 centimeters × 6 centimeters, have been designated by reference character 10. According to the illustration of FIG. 1 the press mold 1 is placed upon a vibrator table or platform 2 in order to more or less uniformly and tightly fill this hollow mold cavity to the level E with a quantity of gravel, sand, expandable polystyrene grit granules and liquid thermally hardenable resin, for instance a phenolic resin, all as designated by reference character 3.

The gravel and sand grains of the mixture 3 have been shown in enlarged sectional view in FIG. 1 in the form of hollow rings designated by reference character 31 whereas the therein individually contained expandable polystyrene grains have been illustrated in the form of the dark-shaded elements 32. In order to improve clarity in illustration the liquid resin has not been cross-hatched.

Now according to the showing of FIG. 2 the filled mold is closed by a cover 11 which can be threadably connected with the body of the mold. In order to initially heat the hollow mold compartment 1 to a temperature in the order of about 100°C to 120°C the mold is placed into a furnace or between the heating plates H1 and H2. Consequently, the polystyrene granules 32' swell or expand under pressure and compact at their surrounding region the mixture 3' of gravel-sand-resin. After gelling and hardening of the resin the mold contents can be further heated to higher temperatures, for instance to 150°C for the purpose of completing hardening. As best seen by referring to FIG. 2 at least the mold cover 11 is provided with holes or perforations 110 which, when the mold is closed, allow for the escape of water vapor out of the hollow mold cavity.

There will now be given hereinafter examples for the fabrication of artificial concrete-plates having dimensions of 60 × 60 × 8 cm³ = 28.8 dm³. Initially there will be given different examples of the materials which can be employed in the practice of the method and thereafter in table form different mixtures which have been used embodying various combinations of these materials.

| Examples of Materials Which Can Be Used | |
| --- | --- |
| A: Sand-gravel-mixture | |
| A1: Seasand: quartz-feldspar-lime-fine grain mixture | |
| Pour Weight approximately 1800 kg/m³ | |
| Grain diameter range $\phi =$ | 0.00 to 0.05 mm.(dust) |
| percent by weight | as small as possible, maximum 3%, better amount 1% |
| Grain diameter range $\phi =$ | 0.05 to 0.5 mm |
| percent by weight | 70 to 90 % |
| Grain diameter range $\phi =$ | 0.5 mm to 3 mm |
| percent by weight | 7 to 27 % |
| A2: Expanded Clay-Gravel pour weight 400 to 500 kg/m³ grain sizes $\phi$ 2 to 8 mm | |

Commercially available product of the Swiss concern HunzikerBaustoffwerke AG, Bern, Switzerland.

B: Expandable polystyrene grit
  Grain sizes dia. — 0.2 to 0.5 mm
  Expandable to pour weight 50 kg to 200 kg/m³ and
  Grain sizes dia. 1–8mm
  Manufacturer: BASF, West Germany.

H: Thermally Hardenable Resin
  Phenol-formaldehyde resin, resole type, commercially available from the German concern Dynamit AG, of Troisdorf, West Germany. This resin is thermally hardenable in a temperature range of 100°C to 150°C without acid, it is liquid to viscous, has a liter weight of about 1.1 to 1.2 kilograms, and the proportion of volatile solvent components (water and alcohol) amount to maximum 20 percent.
  Resole type phenol-formaldehyde resins are also described in Handbook of Reinforced Plastics of the Society of the Plastic Industry, Chapter II-2, pages 56 to 70, by Samuel S. Oleesky and J. Gilbert Mohr, 1964 edition, Reinhold Publishing Corporation, New York, USA. As there stated, in the formation of resoles the steps which occur in order are (1) methylolation, or entry of methylol ($CH_2OH$) groups into the phenol ring in the ortho or para position, (2) condensation of two methylol groups to form an ether bridge, (3) condensation between a methylol group and a phenol nucleus to form a methylene bridge ($-CH_2-$), and (4) decomposition of ether bridges ($-O-$) to form methylene bridges and formaldehyde which immediately reacts via the first three reactions.

F1: Asbestos Fibers: length 5 to 14 mm.
F2: Glass Fibers: length 5 to 15 mm.

In the Table given hereinafter there are enumerated four Examples of mixtures based upon the weight per article plate produced according to the inventive method and listing the various components for the different mixtures.

TABLE

| Components | Mixture 1 | | Mixture 2 | | Mixture 3 | | Mixture 4 | |
|---|---|---|---|---|---|---|---|---|
| | | % | | % | | % | | % |
| A1 Fine Sand | 41.00kg | 91 | 38.70kg | 86 | 38.70kg | 86 | 21.60kg | 67.5 |
| A2 Expanded Clay-Gravel | | | | | | | 6.88kg | 21.5 |
| B Unexpanded Polystyrene | 0.90kg | 2 | 0.90kg | 2 | 0.90kg | 2 | 1.28kg | 4 |
| H Resin | 3.15kg | 7 | 3.15kg | 7 | 3.15kg | 7 | 2.24kg | 7 |
| F1 Asbestos Fibers | | | 2.25kg | 5 | | | | |
| F2 Glass Fibers | | | | | 2.25kg | 5 | | |
| Total Mixture Weight | 45 kg | 100 | 45 kg | 100 | 45 kg | 100 | 32 kg | 100 |
| Final Weight as a Function of Water Loss | ≈ 44 kg | | ≈ 44 kg | | ≈ 44 kg | | ≈ 31 kg | |
| Specific Sand Weight | ≈ 1,46kg/dm³ | | ≈ 1,46kg/dm³ | | ≈ 1,46kg/dm³ | | ≈ 1,08kg/dm³ | |
| Bending-Tension Strength | 35kg/cm² | | 45kg/cm² | | 54kg/cm² | | 25kg/cm² | |

Procedures:
Filling mixtures tightly into mold
Closing mold
Heating mold between heating plates
1st Stage 20–40 Min. at 100°C
2nd Stage 20–40 Min. at 150°C While there is shown and described present preferred embodiments of the invention, it is to be distinctly understood that the invention is not limited thereto but may be otherwise variously embodied and practiced within the scope of the following claims. Accordingly,

What is claimed is:

1. A method of fabricating dimensionally stable and load-carrying artificial concrete-construction elements comprising the steps of: admixing with at least 85 percent by weight of a loose mass of mineral grains from 2 to 5 percent by weight of a fine grain granulate of thermoplastic material which can expand into essentially voluminous foamed grains within a given swelling temperature range while internally developing pressure and from about 5 to 10 percent by weight of a non-hardening thermosetting resin which begins to gell within the aforementioned swelling temperature range and completely hardens at higher temperature values, until forming a homogeneous distribution of these components, filling this mixture into the hollow mold cavity of a mold, then sealing the mold in a pressure-tight fashion and initially externally heating the mold up to the swelling temperature range and thereafter to the higher hardening temperature range of the resin.

2. The method as defined in claim 1, including the step of filling the mixture into a mold which is still pervious to water vapor after closing such mold, said thermoplastic material being expandable polystyrene grit, said thermo-setting resin being a liquid resole phenol-formaldehyde resin which gells at the swelling temperature range of the polystyrene and thermally hardens at higher temperature values, the resin constituent of the liquid phenol-formaldehyde resin based upon the liquid quantity of such phenol-formaldehyde resin containing at most 20 percent volatile constituents.

3. The method as defined in claim 1, including the step of depositing into the mold different layers of mineral grain mixtures having different content of any one of the expandable granulate, resin, or different grain size spectrum, and in a single working operation while developing internal pressure in the mold thermally hardening the mixture so as to intimately bond together the mixture components into one-piece.

4. The method as defined in claim 1, including the step of filling into the mold a mixture which additionally contains fibers in a homogeneous and random dispersion therein, said fibers being present in an amount by weight which exceeds 2 percent of the total weight of the mixture.

5. A method of fabricating dimensionally stable and load-carrying components, especially artificial concrete-construction elements, comprising the steps of admixing (a) at least 85 percent by weight of a loose mass of mineral grains, (b) from 2 to 5 percent by weight unexpanded thermoplastic material capable of expanding into voluminous foamed granules, and (c) from about 5 to 10 percent by weight of a nonhardened thermosetting resin which begins to gell within the swelling temperature of the expandable plastic and at increased temperatures completely hardens, then filling this mixture into a mold, closing the mold, heating the mold to the swelling temperature of the expandable plastic.

6. The method as defined in claim 5, further including the step of adding fibers to the mixture.

7. The method as defined in claim 5, wherein said expandable plastic is polystyrene.

8. The method as defined in claim 5, wherein the resin is a resole phenol-formaldehyde resin.

* * * * *